(12) United States Patent
Williams

(10) Patent No.: US 6,613,841 B2
(45) Date of Patent: *Sep. 2, 2003

(54) PREPARATION OF MACHINE DIRECTION ORIENTED POLYETHYLENE FILMS

(75) Inventor: Kelly L. Williams, Maineville, OH (US)

(73) Assignee: Equistar Chemicals, LP, Houston, TX (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/058,894

(22) Filed: Jan. 28, 2002

(65) Prior Publication Data

US 2003/0144426 A1 Jul. 31, 2003

(51) Int. Cl.[7] .................. C08L 23/00; C08L 27/06; C08L 33/04; C08L 35/02; C08L 45/00
(52) U.S. Cl. .............. 525/191; 525/211; 525/222; 525/239; 525/240
(58) Field of Search ............... 525/191, 211, 525/222, 239, 240

(56) References Cited

U.S. PATENT DOCUMENTS

| | | | |
|---|---|---|---|
| 4,086,204 A | 4/1978 | Cassandrini et al. | 260/45.8 NT |
| 4,331,586 A | 5/1982 | Hardy | 525/186 |
| 4,464,518 A | 8/1984 | Iwabuchi et al. | 526/127 |
| 4,542,199 A | 9/1985 | Kaminsky et al. | 526/160 |
| 4,812,500 A | 3/1989 | Hayden | 524/99 |
| 5,539,124 A | 7/1996 | Etherton et al. | 548/402 |
| 5,637,660 A | 6/1997 | Nagy et al. | 526/160 |
| 5,756,611 A | 5/1998 | Etherton et al. | 526/127 |
| 6,034,027 A | 3/2000 | Krishnamurti et al. | 502/200 |
| 6,171,993 B1 | 1/2001 | Mavridis et al. | 502/103 |
| 6,355,733 B1 | 3/2002 | Williams et al. | 525/191 |
| 6,486,270 B1 * | 11/2002 | Garrison et al. | 526/65 |

OTHER PUBLICATIONS

U.S. Appl. Ser. No. 09/648,303, Filed Aug. 25, 2000, "High Molecular Weight, Medium Density Polyethylene". Garrison et al.

* cited by examiner

*Primary Examiner*—Nathan M. Nutter
(74) *Attorney, Agent, or Firm*—Shao Guo

(57) ABSTRACT

A process for making MD (machine direction) oriented polyethylene film is disclosed. The process comprises blending a high-molecular weight, medium-density polyethylene (HMW MDPE) and a linear low-density polyethylene (LLDPE), converting the blend into a thick film, and orienting the thick film into a thinner film in the machine direction. The resulting film has high modulus, high gloss, low haze, and relatively high MD tear and dart impact.

8 Claims, No Drawings

PREPARATION OF MACHINE DIRECTION ORIENTED POLYETHYLENE FILMS

FIELD OF THE INVENTION

The invention relates to the preparation of uniaxially oriented polyethylene films. More particularly, the invention relates to the preparation of uniaxially oriented polyethylene films from a blend comprising a high molecular weight, medium density polyethylene (HMW MDPE) and a linear low density polyethylene (LLDPE).

BACKGROUND OF THE INVENTION

Polyethylene is divided into high-density (HDPE, density 0.941 g/cc or greater), medium-density (MDPE, density from 0.926 to 0.940 g/cc), low-density (LDPE, density from 0.910 to 0.925 g/cc), and linear low-density polyethylene (LLDPE, density from 0.910 to 0.925 g/cc). (See ASTM D4976-98: Standard Specification for Polyethylene Plastic Molding and Extrusion Materials.) One of the main uses of polyethylene (HDPE, LLDPE, and LDPE) is in film applications, such as grocery sacks, institutional and consumer can liners, merchandise bags, shipping sacks, food packaging films, multi-wall bag liners, produce bags, deli wraps, stretch wraps, and shrink wraps. The key physical parameters of polyethylene film include tear strength, impact strength, tensile strength, stiffness and clarity. Tear strength is measured in machine direction (MD) and transverse direction (TD). Total tear strength (the product of MD tear and TD tear) is an indicator of overall tear properties. Critical processing properties on the film line include the output, bubble stability, gauge control (variability in film thickness), extruder pressure and temperature.

Film stiffness can be measured by modulus. Modulus is the resistance of the film to deformation under stress. It relates to its density. A higher density gives a higher modulus. A typical LLDPE film has a modulus of about 32,000 psi, while an HDPE film has a modulus of about 100,000 psi or higher. LLDPE film has higher impact strength than MD tear, while HDPE has higher stiffness and tensile strength. When LLDPE producers attempt to increase the density (thereby increasing the modulus of the film), they often encounter losses in impact strength and MD tear. Historically, blending LLDPE and HDPE has not achieved "breakthrough" success. The blends often give films that have improved stiffness and tensile properties, but the impact and tear properties are usually sacrificed. There are no straightforward methods or single resins that have the combined properties of both.

Recently, a high-molecular weight, medium-density polyethylene (HMW MDPE) has been developed (see co-pending application Ser. No. 09/648,303, filed on Aug. 25, 2000). The HMW MDPE has many unique properties and offers new opportunities for improvement of polyethylene films. Co-pending application Ser. No. 09/688,314 teaches a blend comprising HWM MDPE and LLDPE. The blend provides films with significantly improved toughness and tear strength compared to MDPE or HDPE and high modulus compared to LLDPE.

Machine direction orientation (MDO) is known to the polyolefin industry. When a polymer is strained under uniaxial stress, the orientation becomes aligned in the direction of pull. Most commercial MDO films are produced by orienting cast extrusion films. When an HDPE film undergoes MDO, the resultant film usually shows improved gloss, clarity, tensile strength, modulus and barrier properties. However, the oriented film often shows greatly reduced machine direction tear strength (MD tear) and dart impact strength.

It would be desirable to prepare polyethylene films that have high modulus, high gloss, low haze, and relatively high MD tear and dart impact strength after MDO.

SUMMARY OF THE INVENTION

The invention is a process for preparing machine direction oriented (MDO) polyethylene films. The oriented film has high modulus, high gloss, low haze, and relatively high MD tear and dart impact. The process comprises blending from about 20 wt % to about 80 wt % of a high-molecular weight, medium-density polyethylene (HMW MDPE) and about 20 wt % to about 80 wt % of a linear low density polyethylene (LLDPE), converting the blend into a film, and orienting the film uniaxially in the machine direction. The HMW MDPE has a density from about 0.92 to about 0.94 g/cc, a melt index ($MI_2$) from about 0.01 to about 0.5 dg/min, and a melt flow ratio MFR from about 50 to about 300. The LLDPE has a density from about 0.90 to about 0.93 cc/g and an $MI_2$ from about 0.5 to about 50 dg/min.

DETAILED DESCRIPTION OF THE INVENTION

The process of the invention comprises blending a high-molecular weight, medium-density polyethylene (HMW MDPE) and a linear low-density polyethylene (LLDPE), converting the blend into a film, and orienting the film uniaxially in the machine direction.

The HMW MDPE has a density within the range of about 0.92 to about 0.94 g/cc. Preferably, the density is within the range of about 0.93 to about 0.94 g/cc. Preferred HMW MDPE is a copolymer that comprises from about 85 wt % to about 98 wt % of recurring units of ethylene and from about 2 wt % to about 15 wt % of recurring units of a $C_3$ to $C_{10}$ α-olefin. Suitable $C_3$ to $C_{10}$ α-olefins include propylene, 1-butene, 1-pentene, 1-hexene, 4-methyl-1-pentene, and 1-octene, and the like, and mixtures thereof.

The HMW MDPE has an $MI_2$ from about 0.01 to about 0.5 dg/min, preferably from about 0.01 to about 0.3 dg/min, and an MFR from about 50 to about 300. Melt index ($MI_2$) is usually used to measure polymer molecular weight, and melt flow ratio (MFR) is used to measure the molecular weight distribution. A larger $MI_2$ indicates a lower molecular weight. A larger MFR indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure. The HMW MDPE has a considerably higher molecular weight (or lower $MI_2$) and a broader molecular weight distribution (or larger MFR) than conventional HDPE or LLDPE.

The HMW MDPE has a multimodal molecular weight distribution. By "multimodal molecular weight distribution," we mean not only that the HMW MDPE has at least two different molecular weight components, but also that the two components differ chemically and structurally from each other. The low molecular weight component has an $MI_2$ within the range of about 50 to about 600 dg/min, while the high-molecular weight component has an $MI_2$ less than about 0.5 dg/min. The high molecular weight (low $MI_2$) component gives the polyethylene superior bubble stability in a blown-film process and the low-molecular weight (high $MI_2$) component gives the polyethylene excellent processability. The low-molecular weight component preferably has a density from about 0.94 to about 0.97 g/cc, which is in the range of the conventional high-density polyethylene (HDPE). The high-molecular weight component preferably has a density from 0.90 to 0.94 g/cc, more preferably from 0.91 to 0.94 g/cc, which is similar to the conventional LLDPE.

Co-pending application Ser. No. 09/648,303, the teachings of which are herein incorporated by reference, teaches the preparation of HMW MDPE by a multiple-zone process with Ziegler catalysts. For example, an HMW MDPE can be produced by polymerizing an olefin mixture containing from about 85 wt % to about 98 wt % of ethylene and from about 2 wt % to about 15 wt % of a $C_3$ to $C_{10}$ α-olefin in a first-reaction zone to produce a first polymer. Volatile materials are removed from the first polymer, and then the polymerization is continued in a second-reaction zone by adding more of the olefin mixture.

LLDPE can be produced by Ziegler catalysts or newly developed single-site catalysts. Ziegler catalysts are well known. Examples of suitable Ziegler catalysts for making LLDPE include titanium halides, titanium alkoxides, vanadium halides, and mixtures thereof. Ziegler catalysts are used with cocatalysts such as alkyl aluminum compounds.

Single-site catalysts can be divided into metallocene and non-metallocene. Metallocene single-site catalysts are transition metal compounds that contain cyclopentadienyl (Cp) or Cp derivative ligands. For example, U.S. Pat. No. 4,542,199, the teachings of which are incorporated herein by reference, teaches metallocene catalysts. Non-metallocene single-site catalysts contain ligands other than Cp but have the same catalytic characteristics as metallocenes. The non-metallocene single-site catalysts may contain heteroatomic ligands, e.g., boraaryl, pyrrolyl, azaborolinyl or quinolinyl. For example, U.S. Pat. Nos. 6,034,027, 5,539,124, 5,756,611, and 5,637,660, the teachings of which are incorporated herein by reference, teach non-metallocene catalysts.

LLDPE resins are usually copolymers of ethylene with 5 wt % to 15 wt % of a long chain α-olefin such as 1-butene, 1-hexene, and 1-octene. Higher puncture resistance and tear strength are typical of LLDPE films. Great impact resistance and tear strength can be achieved by using 1-octene as the comonomer. Conventional 1-hexene based LLDPE is inferior to that made with 1-octene. However, higher performance 1-hexene based LLDPE, which has comparable properties to 1-octene based LLDPE, has been developed (e.g., see U.S. patent application Ser. No. 09/205,481, filed Dec. 4, 1998.). Usually, when conventional HDPE and LLDPE are blended, the blend does not synchronize the performance of the components. However, when LLDPE is blended with the newly developed HMW MDPE described above, the blend exhibits better performance than the sum of the single components (see co-pending application Ser. No. 09/688,314). Also, by blending HMW MDPE with LLDPE, film densities can be achieved as low as current commercial LLDPE offerings and as high as commercial MDPE offerings, thus bridging the modulus gap between LLDPE and HDPE without sacrificing impact and tear properties.

Suitable LLDPE for the use in the invention has a density within the range of about 0.90 to about 0.93 g/cc and an $MI_2$ within the range of about 0.5 to about 50 dg/min.

Blending HMW MDPE and LLDPE can be performed in a solution or in a thermal processing (dry blending). Dry blending is preferred. One advantage of the invention is that the HMW MDPE and LLDPE can be easily blended. These two polymers can be blended in a metal drum at ambient temperature and tumbled until uniformly mixed.

The resulting blend comprises from about 20 wt % to about 80 wt % of a linear low-density polyethylene (LLDPE). Preferably, the blend comprises from about 30 wt % to about 70 wt % of LLDPE. Optionally, the blend contains a third polymer. Adding a third polymer into the blend can either enhance the performance of the product or reduce the cost. For example, an addition of a third polymer may increase the printability or the clarity of the film. Suitable third polymers include polyethylene resins other than specified above, e.g., low-density polyethylene (LDPE) and HDPE, polypropylene, polyester, acrylic resin, polyvinyl alcohol, polyvinyl chloride, polyvinyl acetate, polyvinyl ether, ethylene-vinyl acetate copolymers (EVA), ethylene-vinyl alcohol copolymers (EVOH), ethylene-acrylic acid copolymers, and the like, and mixtures thereof. A third polymer is added in an amount preferably less than 50 wt % of the total blend.

Optionally, the blend also contains antioxidants, UV-absorbents, flow agents, or other additives. The additives are well known in the art. For example, U.S. Pat. Nos. 4,086,204, 4,331,586, and 4,812,500, the teachings of which are herein incorporated by reference, teach UV stabilizers for polyolefins. Additives are added in an amount preferably less than 10 wt % of the total blend.

The blend is converted into a thick film. Preferably, the blend is converted into a thick film on a blown-film line. The process temperature is preferably within the range of about 150° C. to about 210° C. The thickness of the film is preferably within the range of about 3 to about 12 mils, more preferably within the range of about 4 to about 6 mils.

The film is then uniaxially stretched in the machine (or processing) direction to a thinner film. The ratio of the film thickness before and after orientation is called "draw-down ratio." For example, when a 6-mil film is stretched to 1-mil, the draw-down ratio is 6. Preferably, the draw-down ratio is such that the film is at or near maximum extension. Maximum extension is the draw-down film thickness at which the film cannot be drawn further without breaking. The film is said to be at maximum extension when machine direction (MD) tensile strength has a less than 100% elongation at break under ASTM D-882. As expected, the gloss of the film increases and the haze of the film decreases with the increase of the draw-down ratio. However, I have unexpectedly found that the MD tear and dart impact decreases when the draw down ratio is less than about 3, but rebounds when the draw-down ratio is such that film is near maximum extension (see Table 1).

During the MDO, the film from the blown-film line is heated to an orientation temperature. Preferably, the orientation temperature is about 60% to about 75% of the difference between the glass transition temperature (Tg) and the melting point (Tm). For instance, if the blend has a Tg of 25° C. and a Tm of 125° C., the orientation temperature is preferably within the range of about 60° C. to about 75° C. The heating is preferably performed utilizing multiple heating rollers.

Next, the heated film is fed into a slow draw roll with a nip roller, which has the same rolling speed as the heating rollers. The film then enters a fast draw roll. The fast draw roll has a speed that is 2.5 to 10 times faster than the slow draw roll, which effectively stretches the film on a continuous basis.

The stretched film then enters annealing thermal rollers, which allow stress relaxation by holding the film at an elevated temperature for a period of time. The annealing temperature is preferably within the range of about 100° C. to about 120° C. and the annealing time is within the range of about 1 to about 2 seconds. Finally, the film is cooled through cooling rollers to an ambient temperature.

The following examples merely illustrate the invention. Those skilled in the art will recognize many variations that are within the spirit of the invention and scope of the claims.

EXAMPLES 1–10

Preparation of MD Oriented Film (a) Preparing HMW MDPE

A catalyst is prepared according to U.S. Pat. No. 4,464,518. The catalyst is dispersed in hexane to yield a catalyst slurry that contains about 1.4 wt % of solids. The catalyst slurry (0.059 parts per hour), triethyl aluminum cocatalyst (0.0033 parts per hour), hexane (41.0 parts per hour), 1-butene (0.37 parts per hour), and ethylene (16.9 parts per hour) are continuously fed into a first reactor. The reactor pressure is controlled at about 140 psig, the temperature at 82° C., and the molar ratio of hydrogen to ethylene in the vapor space at about 3.8 to give a first polymer. The first polymer has an $MI_2$ of 220 dg/min and a density of 0.95 g/cc.

The first polymer is transferred to a flash drum, where a portion of the volatile materials are removed. The mixture is then transferred to a second reactor. Hexane (42.9 parts per hour), 1-butene (1.23 parts per hour) and ethylene (18.6 parts per hour) are continuously fed into the second reactor. The reactor temperature is maintained at 77° C., and the molar ratio of hydrogen to ethylene in the vapor space at about 0.05 to give a second polymer that has an $MI_2$ of about 0.08 dg/min and a density of 0.94 g/cc.

The second polymer is isolated and dried under nitrogen. The dried powder is then compounded in the presence of 5% oxygen in the presence of a suitable stabilization package to give a polyethylene having an $MI_2$ of 0.05 dg/min, an MFR of 145, and a density of 0.94 g/cc.

(b) Blending HMW MDPE With LLDPE

The HMW MDPE is dry blended with a commercial LLDPE (Petrothene Select™ Super Hexene LLDPE, product of Equistar Chemicals, LP) in a ratio of 50/50 by weight. The LLDPE has an $MI_2$: 0.70 dg/min and density: 0.92 g/cc. The LLDPE and HMW MDPE resins are dry blended and fed into an extruder. The resultant blend has $MI_2$: 0.30 dg/min and density: 0.93 g/cc.

(c) Converting the Blend to a Thick Film

The blend is converted into films with a thickness of 4.0 mil on a 200 mm die with 1.5 mm die gap. The films are produced at a stalk height of six die diameters and at blow-up ratios (BUR) of 3:1 for Examples 1–5 and 4:1 for Examples 6–10, respectively.

(d) Orienting the Film Uniaxially in Machine Direction

The film from step (c) is stretched into a thinner film in the machine direction. The draw-down ratios in Examples 1–5 and 6–10 are 0, 2, 3, 4, and 5, respectively. When the draw-down ratio is 0, the film is not oriented. The film properties are listed in Table 1.

TABLE 1

| | | | | | Film Properties | | | |
|---|---|---|---|---|---|---|---|---|
| Ex. No. | Draw-Down Ratio | BUR | Gloss | Haze @ 45° | MD Tear, grams | MD Modulus, psi | MD Tensile Elongation @ Break, % | Dart Impact, grams |
| 1 | 0 | 3:1 | 7.3 | 70% | 1100 | 54680 | 690 | 560 |
| 2 | 2 | 3:1 | 8.3 | 64% | 68 | 52350 | 350 | 189 |
| 3 | 3 | 3:1 | 15 | 46% | 29 | 53970 | 190 | 129 |
| 4 | 4 | 3:1 | 29 | 29% | 25 | 70570 | 110 | 128 |
| 5 | 5 | 3:1 | 42 | 20% | 86 | 99550 | 64 | 150 |
| 6 | 0 | 4:1 | 6.0 | 73% | 540 | 56590 | 620 | 552 |
| 7 | 2 | 4:1 | 7.7 | 66% | 45 | 56720 | 310 | 129 |
| 8 | 3 | 4:1 | 15 | 46% | 20 | 60050 | 184 | 95 |
| 9 | 4 | 4:1 | 29 | 29% | 22 | 78300 | 100 | 98 |
| 10 | 5 | 4:1 | 40 | 22% | 130 | 113220 | 51 | 107 |

I claim:
1. A process for preparing a film, said process comprising:
 (a) blending
  (i) from about 20 wt % to about 80 wt % of a high-molecular weight, medium density polyethlene that has a density within the range of about 0.92 to about 0.94 g/cc, an $MI_2$ within the range of about 0.01 to about 0.5 dg/min, an MFR within the range of about 50 to about 300, and a multimodal molecular weight distribution comprising a low-molecular weight component and a high-molecular weight component wherein the low molecular weight component has an $MI_2$ from about 50 to about 600 dg/min and a density from about 0.94 to about 0.97 g/cc; and (ii) from about 20 wt % to about 80 wt % of a linear low-density polyethylene that has a density within the range of about 0.90 to about 0.93 cc/g and an $MI_2$ within the range of about 0.5 to about 50 dg/min;

(b) converting product of step (a) into a film; and (c) orienting the film of step (b) uniaxially in the machine direction.

2. The process of claim 1 wherein the film produced in step (c) has a draw-down ratio greater than about 3.

3. The process of claim 1 wherein the film produced in step (c) has a draw-down ratio greater than about 4.

4. The process of claim 1 wherein the linear low-density polyethylene is a copolymer of ethylene with an α-olefin selected from the group consisting of propylene, 1-butene, 1-pentene, 1-hexene, 1-octene, 4-methyl-1-pentene, and mixtures thereof.

5. The process of claim 1 wherein the linear low-density polyethylene is a copolymer of ethylene with 1-hexene.

6. The process of claim 1 wherein the high-molecular weight, medium-density polyethylene has a density within the range of about 0.93 to about 0.94 g/cc.

7. The process of claim 1 wherein the high-molecular weight, medium-density polyethylene has an $MI_2$ within the range of about 0.01 to about 0.3 dg/min.

8. A film produced by the process of claim 1.

* * * * *